R. CONNELL.
MEANS FOR AUTOMATICALLY INFLATING PNEUMATIC TIRES.
APPLICATION FILED JULY 12, 1906.
961,104.
Patented June 14, 1910.
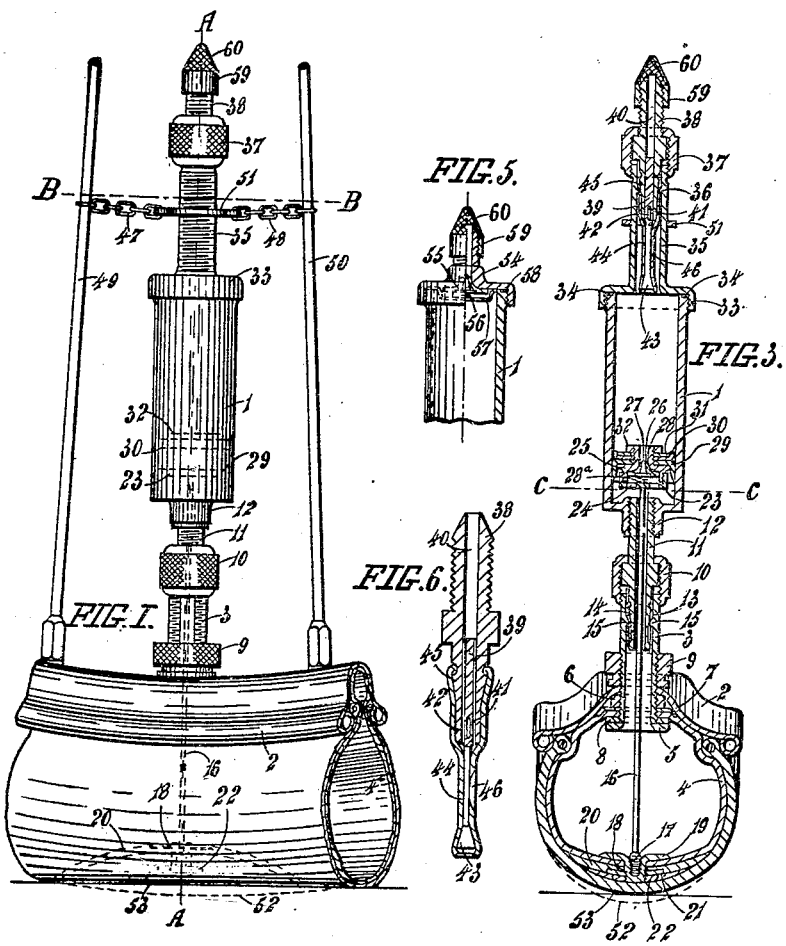
Witnesses.
Inventor.
Roger Connell.
By Baldwin & Rayward
Attorneys.

UNITED STATES PATENT OFFICE.

ROGER CONNELL, OF WESTPORT, NEW ZEALAND.

MEANS FOR AUTOMATICALLY INFLATING PNEUMATIC TIRES.

961,104.  Specification of Letters Patent.  Patented June 14, 1910.

Application filed July 12, 1906. Serial No. 325,932.

*To all whom it may concern:*

Be it known that I, ROGER CONNELL, a subject of His Majesty the King of Great Britain and Ireland, residing at Westport, in the provincial district of Westland, in the Colony of New Zealand, have invented certain new and useful Improvements in Means for Automatically Inflating Pneumatic Tires, of which the following is a specification.

This invention relates to the class of apparatus employed for the automatic inflation of pneumatic tires of bicycles and other vehicles during the travel of the vehicle.

According to my invention an air pump fixed to the rim of the wheel and projecting inward diametrically is fitted with a plunger which is reciprocated by a flexible rod projecting through the rim into and across the tube. The end of this rod screws into a nipple fixed to or hinged upon a plate secured to the inside of the outer periphery of the air tube.

An inlet air valve may be provided in the cover of the pump and an inflation valve through which air may be drawn is employed upon the outside of the pump. This inflation valve is preferably constructed after the manner of those usually used on pneumatic tires but instead of the rubber tube covering holes in the air pipe, the tube fits loosely over a hinged spindle and is slit for the admission of air to the pump, the closure being effected by the collapse of the tube under pressure of air on the outside.

The air pump is fixed to the casing of an ordinary air valve fixed to the air tube by a screw cap which forces a tapering rubber covered plug into the end of the casing. The outer end of the pump may be stayed by chains or bars connecting it to the spokes of the wheel.

My invention differs from similar apparatus heretofore used in the following particulars: the piston rod is flexible, and the air valves are specially constructed for my purpose. Air is forced into the air tube by the expansion of the air tube and outer cover after they have been pressed in over the site of the plunger by the pressure of the wheel upon the road.

The drawing illustrates the invention.

Figure 1 is a side elevation, Fig. 2 is a sectional plan on line B. B. Fig. 1, Fig. 3 is a cross vertical section on line A. A. Fig. 1, and Fig. 4 is a sectional plan on line C. C. Fig. 3 of the invention, Fig. 5 is an elevation partly in section of a modification, and Fig. 6 is a sectional elevation on a larger scale of a valve.

The pump barrel 1 is fixed to the rim 2 of the wheel by means of a valve casing 3 secured to the inner tube 4 by a shoulder 5, nut 6 and washers 7 and 8, and a thumb nut 9 in a well-known manner. The valve casing 3 has a screw cap 10 which fits upon a tubular union 11, one end of which screws into a neck 12 integral with the pump barrel, and has its other end entering the valve casing 3.

An air tight joint is made between the union and the interior of the valve casing by means of a rubber tube 13 which is squeezed between the taper 14 of the union and a correspondingly tapered shoulder 15 upon the interior of the valve casing when the screw cap 10 is tightened up. A rod 16 made of flexible steel wire has a threaded end 17 secured into a nipple 18 integral with a plate 19 secured to, and made air tight with, the inside of the outer periphery of the inner tube 4 by means of a flexible washer 20 cemented to the inner tube, by a metal washer 21 passing upon the nipple 18, and by a nut 22 screwed upon the nipple. The other end of the rod 16 passes slidably through the union 11 and into the pump barrel and is fixed to a cap 23 provided with perforations 24 for the passage of air. The said cap is screwed upon a plunger 25 which is preferably provided with a rubber valve seat 26 and a valve 27 normally held upon its seat by a spiral spring $28^a$ in compression between the cap 23 and the said valve. The plunger has a hollow neck 28 threaded upon its exterior, and upon which is passed a cupped leather washer 29, backing washers 30 and 31 and a nut 32. Air can pass by the valve 27 and between the periphery of the washer 29 and the pump barrel upon the inward stroke of the plunger, and is retained during the inward stroke thereof by the closing of the valve upon its seat under the action of the spring $28^a$ and by the washers 29 closing upon the surface of the pump barrel.

The top of the pump barrel 1 is fitted with a screw cap 33 made air tight with the pump barrel by a washer 34. The cap 33 has a hollow neck 35 provided with a sloping shoulder 36 and a screw cap 37. A nipple 38 is attached to the neck 35 by the cap 37 and is provided with a spindle 39 that part of which lying inside the nipple is rectangular in cross section to provide a passage for air as shown in Fig. 2. The said part of the rod enters a hole 40 extending throughout the length of the nipple 38 and is retained therein by a pin 41 passing through the nipple and through a slot 42 formed in the rod. The other end of the spindle projects downwardly from the nipple and has a swelled end 43. A rubber tube 44 fits upon the lower part of the nipple 38 and is squeezed between the sloping collar 45 thereof and the sloping shoulder 36 by the cap 37 to make an air tight joint. The lower part of the tube 44 envelops the end 43 and the lower part of the spindle 39. A slit 46, having its edges in contact with each other, is formed in the rubber sleeve 44, so that air passes freely outwardly from the tube, but air pressure upon the exterior of the tube closes the edges of the slit tightly together and thus prevents air from passing into the tube.

The spindle is slotted to allow it to recede into the hole 40 while the tube 44 is placed in position. During this operation it is almost impossible to prevent buckling of the tube whereby the slit 46 is held open and so that it will not close under exterior air pressure. After the tube, however, has been pushed upon the rod and the nipple 38, the elasticity of the tube withdraws the rod until retained by the pin 41, the tube is then straightened and the slit is in position to open and close as required. The upper end of the pump is stayed by chains 47 and 48 attached at one end to the spokes 49 and 50 of the wheel, and at their other ends to a washer 51 passed upon the neck 35.

The pump is operated by the pressure upon the wheel compressing the tire out of its true circular shape as shown by the dotted lines 52 in Figs. 1 and 3 to the flattened shape shown by the unbroken lines 53. An inward stroke is thus imparted to the plunger 25 so long as the pressure upon the tire is sufficient to cause a flattening of its periphery, as just described. During such inward stroke of the plunger, air passes from the upper part of the pump barrel past valve 27 and the washer 29 into the lower part of the barrel. The inward stroke of the piston is so rapid that passage of air from the tire to the lower part of the barrel through the fine annular space between the piston rod and the union 11 is prevented or retarded sufficiently to permit a vacuum or partial vacuum to be formed in the lower part of the pump for the purpose of obtaining the passage of air from the upper to the lower part of the pump. A return stroke of the plunger takes place when the rod 16 is forced outwardly owing to the pressure of the air in the interior of the tire, which takes place when that part of the tire to which the rod is attached is enabled to resume its normal shape after it is relieved of external pressure arising from contact of the wheel with the ground. The return stroke being much slower than the inward stroke, the air confined in the lower part of the pump has time to pass through the union 11 and past the piston rod into the tire.

By making the piston rod 16 flexible, damage will not result from slight "creeping" of the tire circumferentially around the rim of the wheel. If the piston rod were inflexible it would be bent unless its outer end 17 was exactly in line with the axis of the cylinder. Similarly damage would result from the lateral deflection of a partially inflated tire, if the piston rod was inflexible. The internal diameter of the casing 3 is made ample, to allow play in all directions for the flexible piston rod.

Referring now to Fig. 5, a form of cap and nipple is shown which is used when there is not sufficient room upon a wheel between the rim and spokes for the longer nozzle shown in Fig. 3. In this case a valve 54, having a seat 55 and spring 56 is employed corresponding in construction to the valve 27 and a perforated plate 57 secured to the cap 58 retains the spring 56 in position. As it is necessary that the inlet of air should not be obstructed and at the same time desirable to prevent dirt obtaining access to the interior of the pump a screw cap 59 is fitted to the nipple and has a conical top 60 made of gauze wire through which air may pass but by which dirt will be excluded. The conical shape of the top provides a great number of interstices for the passage of air, and also affords less lodgment for dirt than a flat top.

What I do claim and desire to secure by Letters Patent of the United States is:—

In a tire inflater of the class described, in combination, a tubular union, a flexible piston rod passing slidably through the union, a cap fixed to the top of the piston rod and having perforations, a plunger to which the cap is screwed and having a valve seat, a spring operated valve fitting the valve seat, a hollow seat upon the plunger, nuts screwed upon the neck, cupped leather washers held by the nuts, a pump barrel fitting the cupped leather washers and attached to the union, and a valve casing having a large internal diameter and through which the piston rod passes, and to which the union is attached, as set forth.

In testimony whereof I have signed my name to this specification in the presence of two witnesses.

ROGER CONNELL.

Witnesses:
 MARION PRINTZEN,
 HENRY JOHN PRIOR.